United States Patent
Sakamoto et al.

(10) Patent No.: US 9,682,745 B2
(45) Date of Patent: Jun. 20, 2017

(54) SADDLE-TYPE VEHICLE

(71) Applicant: HONDA MOTOR CO., LTD., Tokyo (JP)

(72) Inventors: Naoki Sakamoto, Wako (JP); Osamu Nishioka, Wako (JP); Kinya Mizuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 236 days.

(21) Appl. No.: 14/662,840

(22) Filed: Mar. 19, 2015

(65) Prior Publication Data

US 2015/0274257 A1  Oct. 1, 2015

(30) Foreign Application Priority Data

Mar. 31, 2014 (JP) .................................. 2014-072612

(51) Int. Cl.
| | |
|---|---|
| *B60K 20/00* | (2006.01) |
| *G05G 9/00* | (2006.01) |
| *B62M 25/08* | (2006.01) |
| *B60K 20/06* | (2006.01) |
| *F16H 59/02* | (2006.01) |
| *B62K 23/02* | (2006.01) |

(52) U.S. Cl.
CPC ............. *B62M 25/08* (2013.01); *B60K 20/06* (2013.01); *B62K 23/02* (2013.01); *F16H 59/02* (2013.01); *Y10T 74/2003* (2015.01)

(58) Field of Classification Search
CPC ...... B62M 25/04; B62M 25/06; B62M 25/08; B60K 20/06; B62K 23/02; B62K 11/14; F16H 59/02; F16H 59/044; F16H 59/12; F16H 61/32; F16H 61/688; F16H 63/46; F16H 2059/0234; B60W 10/02; B60W 10/11; B60W 30/19
See application file for complete search history.

(56) References Cited

U.S. PATENT DOCUMENTS

| | | | | |
|---|---|---|---|---|
| 6,481,554 | B1 * | 11/2002 | Ota ....................... | F16D 48/064 192/103 R |
| 6,502,681 | B1 * | 1/2003 | Ota ....................... | F16D 48/064 192/103 R |
| 7,497,804 | B2 * | 3/2009 | Minami ................ | F16D 48/068 477/78 |
| 8,087,505 | B2 * | 1/2012 | Ishida .................... | B62K 11/14 192/20 |

(Continued)

FOREIGN PATENT DOCUMENTS

JP     2010-120597    6/2010

*Primary Examiner* — David M Fenstermacher
*Assistant Examiner* — Jake Cook
(74) *Attorney, Agent, or Firm* — Rankin, Hill & Clark LLP

(57) ABSTRACT

A saddle-type vehicle that allows common use of a handle switch with a vehicle having no advancing-backing function and can suppress increase in the number of switches and the lowering of the layout efficiency of the switches. A saddle-type vehicle has a reverse mode setting input part that sets a reverse mode in which backing driving of the saddle-type vehicle is permitted and a control system that disables shift operation of a transmission by a shift-down switch and a shift-up switch and causes the saddle-type vehicle to advance through operation of the shift-down switch and to back through operation of the shift-up switch when the reverse mode is set.

19 Claims, 9 Drawing Sheets

(56) References Cited

U.S. PATENT DOCUMENTS

| | | | | |
|---|---|---|---|---|
| 8,357,864 | B2 * | 1/2013 | Murasawa | B60K 20/06 200/61.88 |
| 8,948,985 | B2 * | 2/2015 | Sakamoto | F16H 59/02 477/156 |
| 2008/0099268 | A1 * | 5/2008 | Hiroi | B60W 10/02 180/293 |
| 2008/0161155 | A1 * | 7/2008 | Suzuki | F16H 61/32 477/98 |
| 2010/0270135 | A1 * | 10/2010 | Murasawa | B60K 20/06 200/61.88 |
| 2013/0105285 | A1 * | 5/2013 | Nakada | B62K 23/02 200/61.54 |

* cited by examiner

SADDLE-TYPE VEHICLE

BACKGROUND OF THE INVENTION

Field of the Invention

The present invention relates to a saddle-type vehicle that carries out advancing and backing.

Description of Related Art

For example, in Japanese Patent Laid-Open No. 2010-120597, a motorcycle in which switching between advancing and backing can be repeatedly made by simple operation is disclosed. Specifically, a dedicated backing mode setting switch is provided and this backing mode setting switch is operated to set the driving mode to a backing mode.

However, due to the need to provide the dedicated backing mode setting switch, it is impossible to allow common use of a handle switch with a motorcycle that does not have the backing mode function. Furthermore, there is a problem that the number of switches increases and the layout efficiency of the switch placement is lowered.

SUMMARY OF THE INVENTION

The present invention is made in view of such problems and an object thereof is to provide a saddle-type vehicle that allows common use of a handle switch with a vehicle having no advancing-backing function and can suppress increase in the number of switches and the lowering of the layout efficiency of the switches.

In accordance with the present invention, in a saddle-type vehicle having a handle switch obtained by providing a switch case with a first shift switch to carry out operation of one of shift-up and shift-down of a transmission and a second shift switch to carry out operation of the other of shift-up and shift-down of the transmission, the switch case being fixed to a handlebar and being provided with a plurality of switches to operate various kinds of electrical components, the following elements are provided: a backing-enabled mode setting input part that sets a backing-enabled mode in which backing driving of the saddle-type vehicle is permitted, and a control system that disables shift operation of the transmission by the first shift switch and the second shift switch and causes the saddle-type vehicle to advance through operation of the first shift switch and to back through operation of the second shift switch when the backing-enabled mode is set.

Therefore, when the backing-enabled mode is set, shift operation of the transmission by the shift switches is disabled and advancing and backing of the vehicle are operated by the shift switches. This can achieve common use of the handle switch with a vehicle that does not have the advancing-backing function. In addition, because a dedicated switch does not need to be provided, increase in the number of switches can be suppressed and the lowering of the layout efficiency of the switches can also be suppressed. It is also possible to make the handle switch compact, of course.

Furthermore, the shift switches are a pair of switches on the shift-up side and the shift-down side and therefore can be used in common corresponding to the advancing and backing switches, which are formed of a pair of switches on the advancing side and the backing side as with the shift switches. This makes it easier for the user to recognize operation compared with the case of common use of other switches and the advancing and backing switches, and thus confusion about the operating method due to the common use of the switches can be avoided.

In further accordance with the present invention, the first shift switch and the second shift switch may serve also as the backing-enabled mode setting input part, and the backing-enabled mode may be set by simultaneous operation of the first shift switch and the second shift switch.

Therefore, operating two switches that are not simultaneously operated normally allows the intention of switching to the backing-enabled mode to be definitely confirmed, which can prevent erroneous operation. In addition, because the first shift switch and the second shift switch serve also as the backing-enabled mode setting input part, there is no need to additionally provide the backing-enabled mode setting input part in the handle switch and thus the handle switch can be made more compact.

In further accordance with the present invention, throttle operation by a driver may be disabled and an engine rotation speed may be controlled and kept constant during a period in which the backing-enabled mode is set. It is known that, for example, the driver is given a feeling of anxiety if the engine rotation speed varies in driving with a motorcycle at an extremely-low speed, such as when the driver is walking while holding the motorcycle being caused to advance or back. However, according to present invention, during the period in which the backing-enabled mode is set, the engine rotation speed is kept constant and therefore hunting of the engine rotation speed (it refers to repetition of a phenomenon in which the engine rotation speed increases or decreases) can be prevented. This can eliminate a feeling of anxiety to the driver due to variation in the engine rotation speed in the period during which the backing-enabled mode is set.

In further accordance with the present invention, a drive system of the transmission may have two clutches, and a driving force in an advancing direction may be generated by connecting one clutch of the two clutches and a driving force in a backing direction may be generated by connecting the other clutch (108A) of the two clutches.

Therefore, in the backing-enabled mode, the vehicle can be made to advance or back by connecting either one clutch. Furthermore, connecting the one clutch and the other clutch enables very-low-speed control by so-called half-clutch control. In addition, advancing, backing, and very-low-speed control in the backing-enabled mode can be controlled by using the first shift switch and the second shift switch, by which the clutch is switched in normal gear shifting. This allows the operation in the backing-enabled mode to match the operational feeling of the driver in the normal driving mode.

For example, by operating the first shift switch in a state in which the driver is operating the second shift switch to make the vehicle back, the driver can intuitively recognize a feeling that a force of advancing is added and brake control is carried out.

In further accordance with the present invention, the first shift switch may be disposed at such a position as to function by being operated in an advancing direction, and the second shift switch may be disposed on the opposite side to the first shift switch across an axial line of the handlebar and at such a position as to function by being operated in a backing direction.

The first shift switch to make the vehicle advance is set at such a position as to function by being operated in the advancing direction and the second shift switch to make the vehicle back is set at such a position as to function by being operated in the backing direction. That is, the operation direction can be made to match the traveling direction of the vehicle, which can improve the operability for the driver.

In further accordance with the present invention, the saddle-type vehicle may have one seesaw switch including the first shift switch and the second shift switch, and the seesaw switch may be so disposed that the first shift switch is located on the front side and the second shift switch is located on the rear side.

Accordingly, the first shift switch to make the vehicle advance is disposed on the front side of the seesaw switch and the second shift switch to make the vehicle back is disposed on the rear side of the seesaw switch. This allows the operation direction of the seesaw switch to match the traveling direction of the vehicle, which can improve the operability for the driver.

In further accordance with the present invention, the control system may cause the first shift switch to function as a shift-up switch and cause the second shift switch to function as a shift-down switch when setting of the backing-enabled mode is deactivated.

Therefore, the first shift switch to perform shift-up of the shifting stage is disposed on the front side of the seesaw switch and the second shift switch to perform shift-down of the shifting stage is disposed on the rear side of the seesaw switch. This allows the operation direction of the seesaw switch to match the shift direction of the shifting stage, which can improve the operability for the driver.

DETAILED DESCRIPTION OF THE INVENTION

An embodiment example in which a saddle-type vehicle according to the present invention is applied to a motorcycle will be described below with reference to FIGS. 1 to 9.

Figure 1:
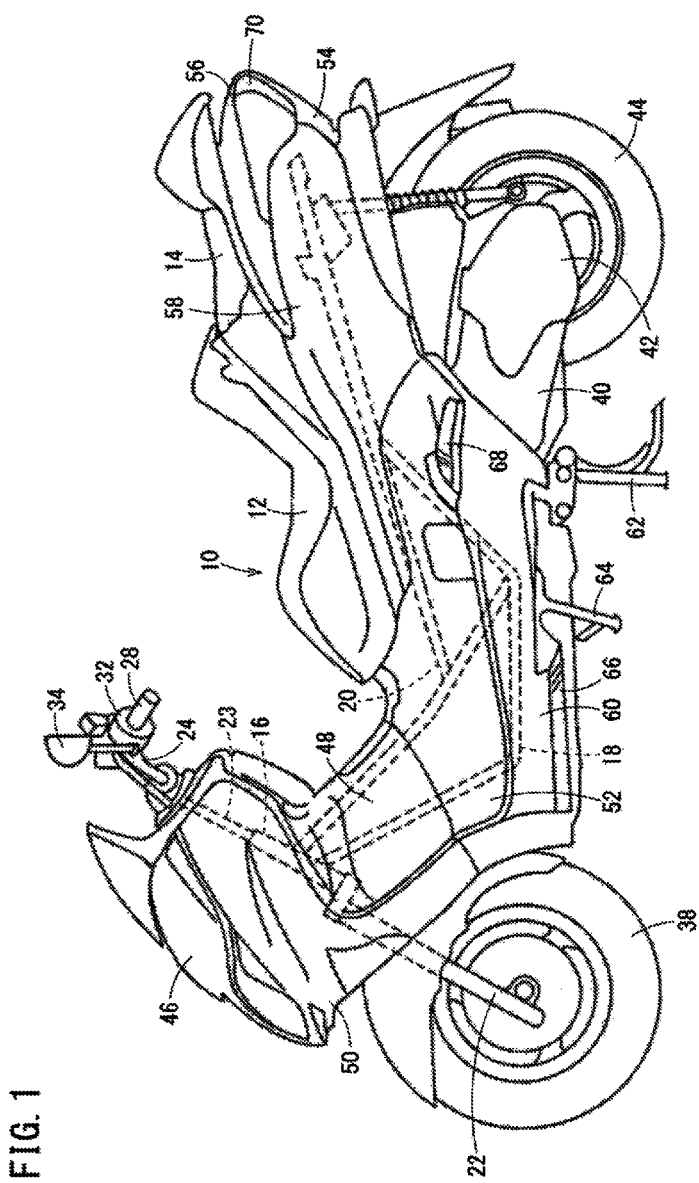
FIG. 1 is a side view showing one example of a saddle-type vehicle according to an embodiment of the present invention.
Figure 2:
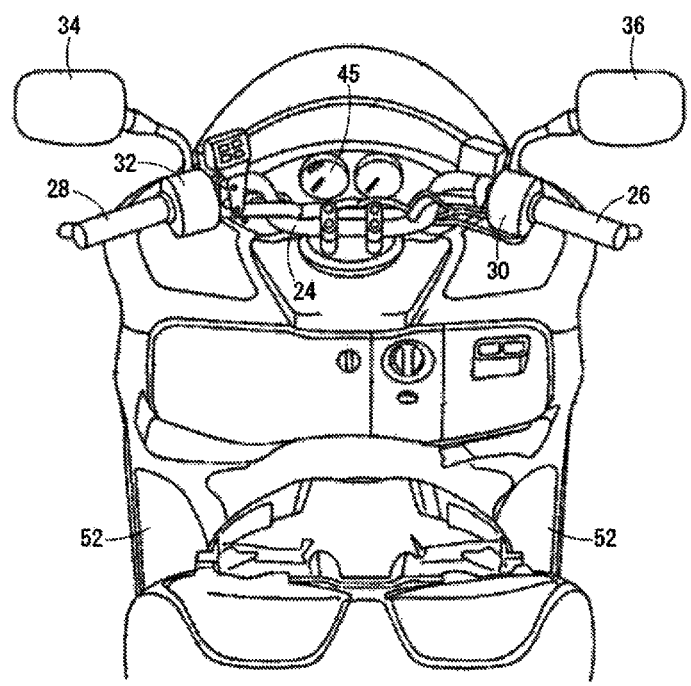
FIG. 2 is a plan view showing a structure around a handlebar of the saddle-type vehicle as viewed from the upper side.

As shown in FIGS. 1 and 2, a motorcycle 10 according to the present embodiment is a tandem vehicle (front-rear two-seated vehicle) having a driver seat 12 and a passenger seat 14. The driver seat 12 and the passenger seat 14 are provided with a seat lock (not shown) unlocked by remote operation.

The vehicle body frame of the motorcycle 10 includes a head pipe 16, a down-tube 18 extending from this head pipe 16 downward and rearward, and a main tube 20 further extending from the down-tube 18 rearward and upward.

A front fork 22 is attached to the head pipe 16 rotatably by handle shaft 23. A handlebar 24 extending along the left-right direction of the vehicle body is attached to the upper part of the handle shaft 23. A right grip 26 is provided at the right end part of this handlebar 24 and a left grip 28 is provided at the left end part. Furthermore, on the handlebar 24, a right switch case 30 is disposed adjacent to the right grip 26 and a left switch case 32 is disposed adjacent to the left grip 28. Moreover, a left mirror 34 and a right mirror 36 are mounted on the handlebar 24. A front wheel 38 is journaled at the lower end of the front fork 22.

An engine (not shown) is suspended on the main tube 20 forming the vehicle body frame and the output power of this engine is transmitted to a rear wheel 44 as a drive wheel via a transmission 40 and a reducer 42. Meters 45 and so forth are disposed around the handlebar 24.

The vehicle body is covered by a front cover 46, leg shields 48, front side covers 50, a floor center cover 52, rear side covers 54, a rear center cover 56, body side covers 58, and floor side covers 60. The vehicle body is so configured as to be capable of self-supporting by a main stand 62 and a side stand 64.

The floor side covers 60 on both lateral sides of the vehicle body are provided with steps 66 for the driver. Furthermore, steps 68 for the passenger are so provided as to extend from the main tube 20 toward the left and right sides. A tail lamp unit 70 is provided between the rear center cover 56 and the rear side covers 54. In this case, position lamp, stop lamp, blinker lamp, etc. are housed in the tail lamp unit 70.

Figure 3:
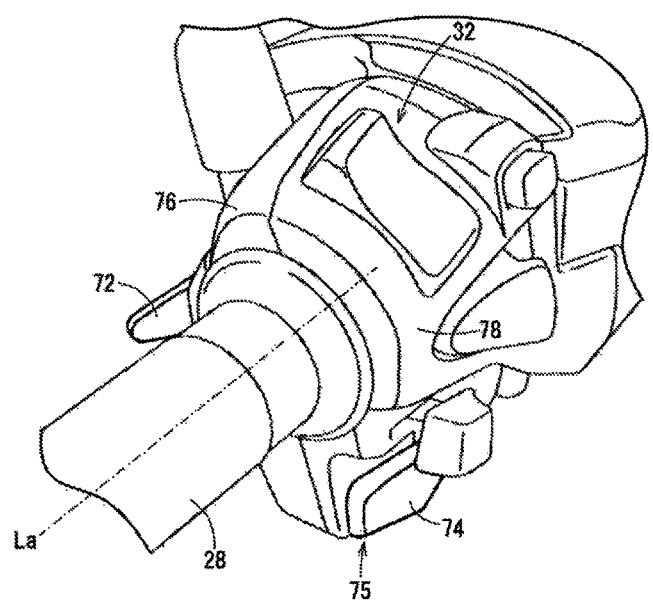
FIG. 3 is a perspective view showing a left switch case provided with a shift-down switch (advancing switch) and a shift-up switch (backing switch).

In the present embodiment, as shown in FIG. 3, the left switch case 32 is provided with a handle switch 75 having at least a shift-up switch 72 and a shift-down switch 74.

Specifically, the left switch case 32 includes a front housing part 76 and a rear housing part 78 as parts obtained by splitting the left switch case 32 into two components, and is attached to the vehicle with a part near the left grip 28 of the handlebar 24 sandwiched by the front housing part 76 and the rear housing part 78 from the front and rear sides. That is, the front housing part 76 is set on the front side across an axial line La of the handlebar 24 and the rear housing part 78 is set on the rear side. The rear housing part 78 is oriented toward the driver side.

The shift-up switch 72 is set at the front housing part 76 and the shift-down switch 74 is set at the rear housing part 78. Specifically, the shift-up switch 72 is disposed at a position suitable for operation thereof by a driver mainly with the left-hand forefinger in a state in which the left grip 28 is grasped with the left hand. Furthermore, the shift-down switch 74 is disposed at a position suitable for operation thereof by the driver mainly with the left-hand thumb. Preferably, the shift-up switch 72 and the shift-down switch 74 are disposed at such positions as to be capable of being simultaneously operated by the driver.

Furthermore, the motorcycle 10 according to this embodiment can carry out, besides a normal driving mode, a reverse mode (backing-enabled mode), in which a driver walks while holding the motorcycle 10 being caused to advance or back in parking thereof or the like for example. Here, the reverse mode does not mean a mode in which only backing is possible but means a mode in which backing is also possible in addition to advancing.

Transition to the reverse mode is made by simultaneously operating the shift-up switch 72 and the shift-down switch 74 under predetermined conditions (reverse mode transition conditions) set in advance.

In the reverse mode, advancing is carried out by operating the shift-down switch 74. The operation to the shift-down switch 74 is e.g. pushing it forward with the thumb and thus evokes the advancing intuitively, which can effectively prevent erroneous operation. Therefore, in the following description, the shift-down switch 74 will be often represented as the advancing switch 74.

Similarly, in the reverse mode, backing is carried out by operating the shift-up switch 72. The operation to the shift-up switch 72 is e.g. pushing it rearward with the forefinger and thus evokes the backing intuitively, which can effectively prevent erroneous operation. Therefore, in the following description, the shift-up switch 72 will be often represented as the backing switch 72.

Transition to the normal driving mode is made by simultaneously operating the shift-up switch 72 and the shift-down switch 74 under predetermined conditions (normal driving mode transition conditions) set in advance.

That is, the combination of the shift-up switch 72 and the shift-down switch 74 forms a reverse mode setting input part 80 (see FIG. 4) that permits backing driving of the motorcycle 10.

A description will be made below with focus on the reverse mode with reference to FIGS. 4 to 8.

Figure 4:
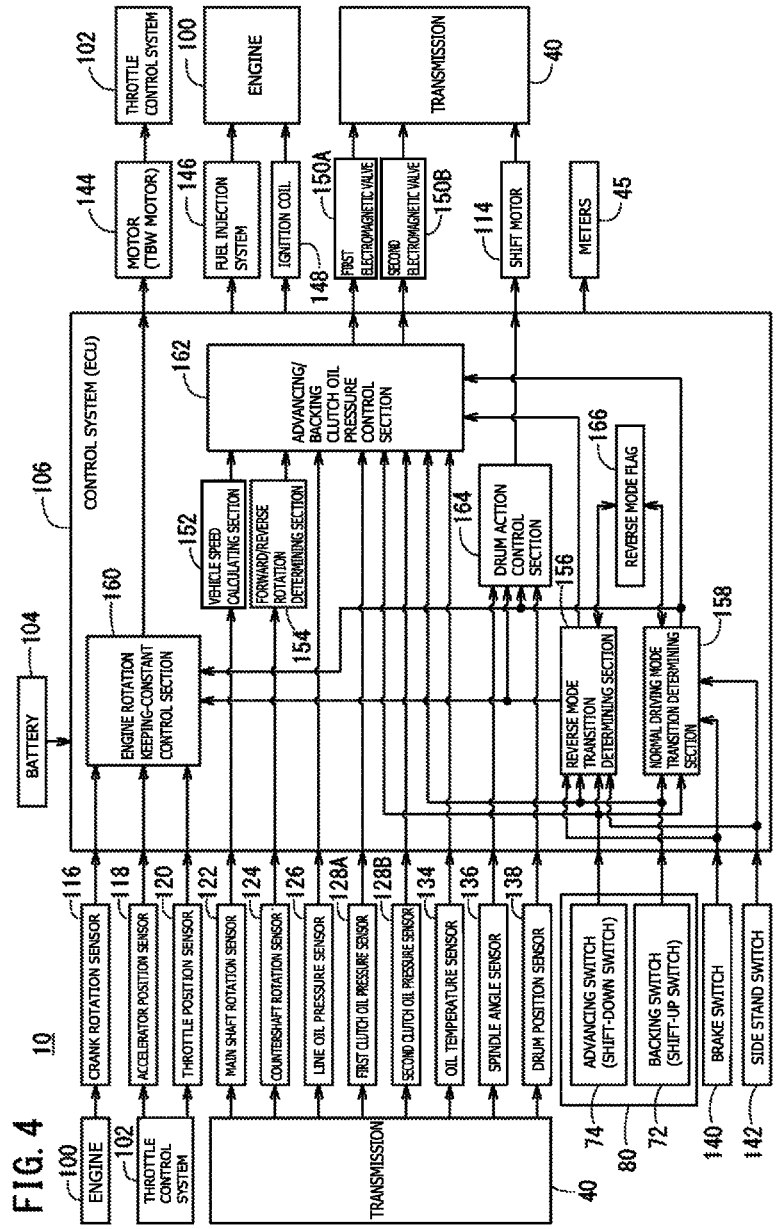
FIG. 4 is a block diagram showing the major part of a control system of the saddle-type vehicle according to the embodiment.

FIG. 4 is a block diagram showing the major part of a control system of the motorcycle 10 according to the present embodiment.

First, the motorcycle 10 has an engine 100 that rotationally drives a crankshaft, a throttle control system 102 (throttle by wire: TBW) that electronically controls a throttle, a transmission 40 that transmits the output power of the crankshaft to a driveshaft, and a control system 106 (ECU) that receives electric power from a battery 104 and controls the motorcycle 10.

Figure 5:
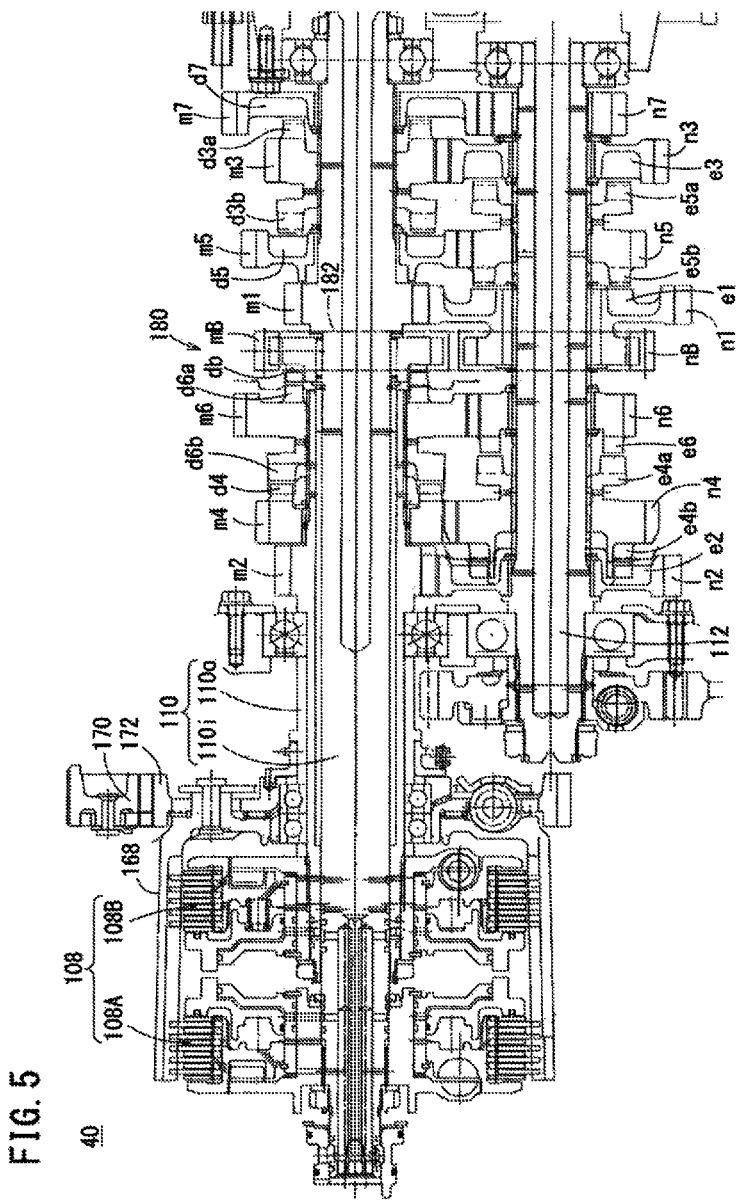
FIG. 5 is a configuration diagram showing a drive system of a transmission.

As shown in FIG. 5, the transmission 40 has a clutch system 108. As the clutch system 108, a dual-clutch system that has, for example, a first clutch 108A and a second clutch 108B and is driven based on a hydraulic system is preferably employed. This will be described later.

Furthermore, the transmission 40 has a main shaft 110 and a countershaft 112 disposed in parallel to the crankshaft, a shift spindle (not shown) rotationally driven by a shift motor 114 (see FIG. 4), and a shift drum (not shown) that couples a driving force by selectively engaging a dog of one of shifting gears with a dog hole according to the rotation angle of the shift spindle. Normally, the countershaft 112 rotates in one direction (rotation for advancing). However, in the present embodiment, it also makes reverse rotation (rotation for backing). This will be described later.

The main shaft 110 is provided with, for example, drive gears m1 to m7 for seven speeds and the countershaft 112 is provided with driven gears n1 to n7 for seven speeds. The respective drive gears m1 to m7 and the driven gears n1 to n7 mesh with each other between the corresponding shifting stages and form shifting gear pairs each corresponding to a respective one of the shifting stages.

As shown in FIG. 4, various kinds of sensors are attached to the above-described engine 100, throttle control system 102, and transmission 40.

For example, to the engine 100, a crank rotation sensor 116 that detects the rotation speed of the crankshaft is attached. To the throttle control system 102, an accelerator position sensor 118 that detects the throttle rotation angle (accelerator position) of the right grip 26 and a throttle position sensor 120 that detects the degree of opening of a throttle valve of the engine 100 (throttle position) are attached.

The transmission 40 has the following sensors: a main shaft rotation sensor 122 and a countershaft rotation sensor 124 that detect the rotation speed of the main shaft 110 and the rotation speed of the countershaft 112; a line oil pressure sensor 126 that detects the oil pressure of a hydraulic path to the clutch system 108; a first clutch oil pressure sensor 128A that detects the oil pressure of the first clutch 108A; a second clutch oil pressure sensor 128B that detects the oil pressure of the second clutch 108B; an oil temperature sensor 134 that detects the temperature of oil 132 in an oil pan 130 (see FIG. 6); a spindle angle sensor 136 that detects the rotation angle of the shift spindle; and a drum position sensor 138 that detects the position of the shift drum.

Detection signals of the above-described various kinds of sensors are input to the control system 106. In addition to these detection signals, various kinds of signals from the shift-up switch 72, the shift-down switch 74, a brake switch 140, and a side stand switch 142 are input to the control system 106.

For example, the shift-up switch 72 and the shift-down switch 74 each output an on-signal over a period in which the switch is being operated, and outputs an off-signal during a period in which it is not being operated. The brake switch 140 also outputs an on-signal over a period in which a brake lever is being operated, and outputs an off-signal during a period in which it is not being operated. The side stand switch 142 outputs, for example, an on-signal when the side stand 64 (see FIG. 1) is in the lowered state and outputs an off-signal when it is in the raised state.

Based on the detection signals from the various kinds of sensors and the signals from the various kinds of switches, the control system 106 controls a motor 144 (TBW motor) of the throttle control system 102, a fuel injection system 146 and an ignition coil 148 of the engine 100, the shift motor 114 of the transmission 40, a first electromagnetic valve 150A for controlling the oil pressure of the first clutch 108A, and a second electromagnetic valve 150B for controlling the oil pressure of the second clutch 108B. Furthermore, the control system 106 outputs calculation results in the control system 106 to the meters 45. The meters 45 output the input calculation results by analog indication (indication by an indicating needle), digital indication, lamp indication, etc.

Moreover, the control system 106 has determining sections and control sections for implementing the above-described reverse mode.

Specifically, these sections are a vehicle speed calculating section 152, a forward/reverse rotation determining section 154, a reverse mode transition determining section 156, a normal driving mode transition determining section 158, an engine rotation keeping-constant control section 160, an advancing/backing clutch oil pressure control section 162, a drum action control section 164, and so forth.

The vehicle speed calculating section 152 calculates the vehicle speed based on the detection signal from the main shaft rotation sensor 122. The forward/reverse rotation determining section 154 determines whether advancing or backing is being carried out based on the detection signal from the countershaft rotation sensor 124.

The reverse mode transition determining section 156 determines whether or not to make transition to the reverse mode based on signals from various kinds of sensors and various kinds of switches. If transition to the reverse mode is made, the reverse mode transition determining section 156 sets "1" in a reverse mode flag 166 for example. The normal driving mode transition determining section 158 determines whether or not to make transition to the normal driving mode based on signals from various kinds of sensors and various kinds of switches. If transition to the normal driving mode is made, the normal driving mode transition determining section 158 resets "1" of the reverse mode flag 166 to "0" for example.

The engine rotation keeping-constant control section 160 disables throttle operation of the right grip 26 by the driver and controls the engine rotation speed and the throttle position to keep them constant. For example, the engine rotation keeping-constant control section 160 controls them into the idle state.

The advancing/backing clutch oil pressure control section 162 carries out brake control for vehicle stopping, clutch oil pressure control for advancing, and clutch oil pressure control for backing based on vehicle speed information from the vehicle speed calculating section 152, the determination result from the forward/reverse rotation determining section 154, and detection signals from the various kinds of oil pressure sensors (126, 128A, 128B) and the oil temperature sensor 134.

In transition from the normal driving mode to the reverse mode, the drum action control section 164 drives the shift motor 114 so that the position of the shift drum may become the position for the reverse mode set in advance. Furthermore, in transition from the reverse mode to the normal driving mode, the drum action control section 164 drives the shift motor 114 so that the position of the shift drum may become the neutral position. The driving of the shift motor 114 is subjected to feedback control based on detection signals from the spindle angle sensor 136 and the drum position sensor 138.

The configuration and action of the clutch system 108, the main shaft 110, and the countershaft 112 in the transmission 40 will be described below with reference to FIG. 5.

The clutch system 108 has a hydraulic disc clutch for odd-numbered stages (first clutch 108A) and a disc clutch for even-numbered stages (second clutch 108B) disposed coaxially with and adjacent to each other. The main shaft 110 has an inner shaft 110i and an outer shaft 110o and these inner shaft 110i and outer shaft 110o are coaxially provided. The first clutch 108A is provided at one end part of the inner shaft 110i and the second clutch 108B is provided at one end part of the outer shaft 110o.

A main-side driven gear 172 meshing with a crank-side drive gear 170 of the crankshaft is provided coaxially with a clutch outer 168 shared by the first clutch 108A and the second clutch 108B. A rotational driving force from the crankshaft is input to the clutch outer 168 via these crank-side drive gear 170 and main-side driven gear 172. The rotational driving force input to the clutch outer 168 is individually transmitted to the inner shaft 110i and the outer shaft 110o according to the connection states of the first clutch 108A and the second clutch 108B.

Figure 6:
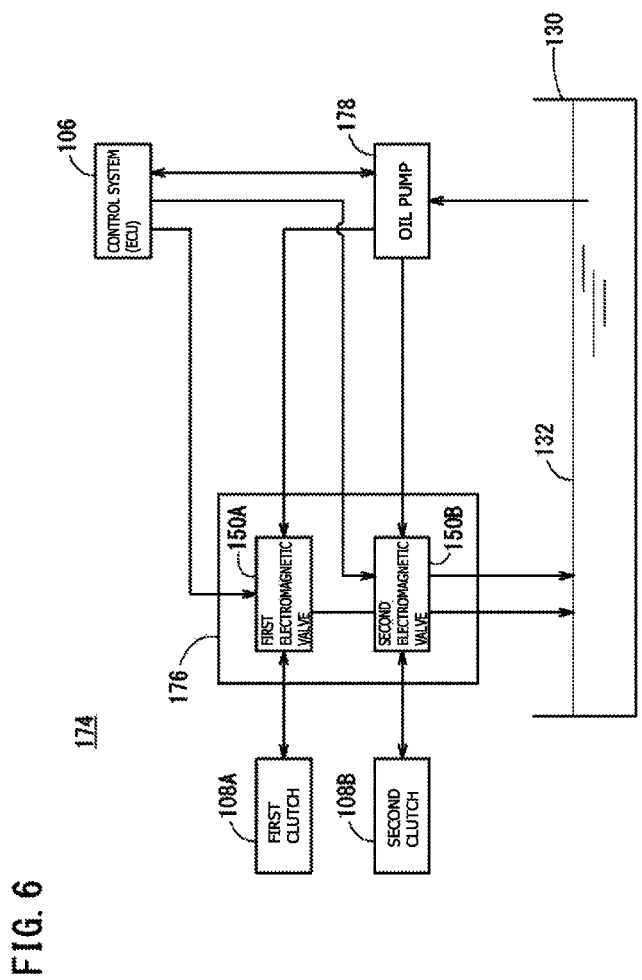
FIG. 6 is a block diagram showing the configuration of a hydraulic supply system.

The connection states of the first clutch 108A and the second clutch 108B are individually controlled based on whether or not hydraulic supply from a hydraulic supply system 174 shown in FIG. 6 is present.

As shown in FIG. 6, the hydraulic supply system 174 has a clutch control system 176 and an oil pump 178 that draws the oil 132 in the oil pan 130 and supplies it to the clutch system 108. The clutch control system 176 has the first electromagnetic valve 150A and the second electromagnetic valve 150B.

The first electromagnetic valve 150A controls the oil pressure to the first clutch 108A based on an instruction from the control system 106. That is, by applying the oil pressure to the first clutch 108A, the inner shaft 110i of the main shaft 110 is connected to the crankshaft. Conversely, this connection is disconnected by lowering the oil pressure to the first clutch 108A.

The second electromagnetic valve 150B controls the oil pressure to the second clutch 108B based on an instruction from the control system 106. That is, by applying the oil pressure to the second clutch 108B, the outer shaft 110o of the main shaft 110 is connected to the crankshaft. Conversely, this connection is disconnected by lowering the oil pressure to the second clutch 108B.

Normally, one of the first clutch 108A and the second clutch 108B is set to the connected state and the other is set to the disconnected state. Power transmission in the transmission 40 is carried out by using any shifting gear pair linked to the inner shaft 110i or the outer shaft 110o. In accordance with operation to the shift-up switch 72 or the shift-down switch 74, the shifting gear pair to be used next is selected among the shifting gear pairs linked to the inner shaft 110i and the outer shaft 110o. Along with this selection, the one clutch in the connected state in the first clutch 108A and the second clutch 108B becomes the disconnected state whereas the other clutch in the disconnected state thus far becomes the connected state. Consequently, power transmission in the transmission 40 is switched to power transmission using the shifting gear pair selected in advance, so that shift-up or shift-down of the transmission 40 is made.

Specifically, the first clutch 108A is connected at first, third, fifth and seventh, and the second clutch 108B is connected at second, fourth, and sixth. That is, in the clutch system 108, gear shifting is carried out by alternately connecting and disconnecting the first clutch 108A and the second clutch 108B every one stage from first to seventh.

As shown in FIG. 5, the transmission 40 is a constant-mesh transmission in which the drive gears m1 to m7 and the driven gears n1 to n7 corresponding to the respective shifting stages constantly mesh with each other.

The respective gears m1 to m7 and n1 to n7 are roughly classified into fixed gears rotatable integrally with the support shaft thereof (main shaft 110, countershaft 112), free gears that are rotatable relative to the support shaft and are incapable of moving in the axial direction, and slide gears that are rotatable integrally with the support shaft and are movable in the axial direction.

Specifically, the drive gears m1 and m2 are fixed gears, the drive gears m3 and m6 are slide gears, and the drive gears m4, m5, and m7 are free gears.

Furthermore, the driven gear n7 is a fixed gear, the driven gears n1 to n3 and n6 are free gears, and the driven gears n4 and n5 are slide gears. Each slide gear is splined to its support shaft.

That is, in the arrangement of the gears on the inner shaft 110i, the fixed gear m1, the free gear m5, the slide gear m3, and the free gear m7 are arranged from the position closest to the clutch system 108 to the remotest position. On the countershaft 112, corresponding to these gears, the free gear n1, the slide gear n5, the free gear n3, and the fixed gear n7 are arranged.

In the arrangement of the gears on the outer shaft 110o, the fixed gear m2, the free gear m4, and the slide gear m6 are arranged from the position closest to the clutch system 108 to the remotest position. On the countershaft 112, corresponding to these gears, the free gear n2, the slide gear n4, and the free gear n6 are arranged.

That is, a relationship is established in which the free gears of the countershaft 112 each mesh with the fixed gear or the slide gear of the main shaft 110, and the slide gears of the countershaft 112 each mesh with the free gear of the main shaft 110.

Dogs d3a and d3b each protruding in the axial direction are provided on both side surfaces of the drive gear m3. By sliding of the drive gear m3 from the neutral position in one of the axial directions (toward the right side in FIG. 5: hereinafter, referred to as the axial-direction right side), one dog d3a is engaged with a dog hole d7 of the drive gear m7. Similarly, by sliding of the drive gear m3 from the neutral position in the other of the axial directions (toward the left side in FIG. 5: hereinafter, referred to as the axial-direction left side), the other dog d3b is engaged with a dog hole d5 of the drive gear m5.

A dog d4 protruding in the axial direction is provided on one side surface of the drive gear m4. Dogs d6a and d6b each protruding in the axial direction are provided also on both side surfaces of the drive gear m6. By sliding of the drive gear m6 from the neutral position toward the axial-direction left side, the other dog d6b is engaged with the dog of the drive gear m4.

Dogs e5a and e5b each protruding in the axial direction are provided on both side surfaces of the driven gear n5. By sliding of the driven gear n5 from the neutral position toward the axial-direction right side, one dog e5a is engaged with a dog hole e3 of the driven gear n3. Similarly, by sliding of the driven gear n5 from the neutral position toward the axial-direction left side, the other dog e5b is engaged with a dog hole e1 of the driven gear n1.

A dog e6 protruding in the axial direction is provided on the other side surface of the driven gear n6. Dogs e4a and e4b each protruding in the axial direction are provided also on both side surfaces of the driven gear n4. By sliding of the driven gear n4 from the neutral position toward the axial-direction right side, one dog e4a is engaged with the dog e6 of the driven gear n6. Similarly, by sliding of the driven gear n4 from the neutral position toward the axial-direction left side, the other dog e4b is engaged with a dog hole e2 of the driven gear n2.

Next, a description will be made about a situation in which shift-up is sequentially made from the neutral state to first to seventh in the normal driving mode state in which the inner shaft 110i is rotationally driven by the first clutch 108A for example. All shift-up actions in the normal driving mode are made to cause the countershaft 112 to make rotation in the reverse direction of the rotation direction of the main shaft 110, i.e. positive rotation. The rotational force of this positive rotation is transmitted to the driveshaft (not shown), so that the motorcycle 10 advances.

If the rotation angle of the shift spindle indicates the neutral state, the drive gears m3 and m6 and the driven gears n4 and n5 are each at the neutral position, and the rotational force of the main shaft 110 is not transmitted to the countershaft 112.

The rotation angle of the shift spindle is changed from the neutral state to first, the driven gear n5 moves toward the axial-direction left side. Consequently, the rotational force of the inner shaft 110i is transmitted to the countershaft 112 via drive gear m1→driven gear n1→n5.

When the rotation angle of the shift spindle is changed from first to second, the first clutch 108A is disconnected to make transition to rotational driving of the outer shaft 110o by the second clutch 108B, and the driven gear n4 moves toward the axial-direction left side. Consequently, the rotational force of the outer shaft 110o is transmitted to the countershaft 112 via drive gear m2→driven gear n2→n4.

When the rotation angle of the shift spindle is changed from second to third, the second clutch 108B is disconnected to make transition to rotational driving of the inner shaft 110i by the first clutch 108A, and the driven gear n5 moves toward the axial-direction right side. Thus, the rotational force of the inner shaft 110i is transmitted to the countershaft 112 via drive gear m3→driven gear n3→n5.

When the rotation angle of the shift spindle is changed from third to fourth, the first clutch 108A is disconnected to make transition to rotational driving of the outer shaft 110o by the second clutch 108B, and the drive gear m6 moves toward the axial-direction left side. Thus, the rotational force of the outer shaft 110o is transmitted to the countershaft 112 via drive gear m6→m4→driven gear n4.

When the rotation angle of the shift spindle is changed from fourth to fifth, the second clutch 108B is disconnected to make transition to rotational driving of the inner shaft 110i by the first clutch 108A, and the drive gear m3 moves toward the axial-direction left side. Thus, the rotational force of the inner shaft 110i is transmitted to the countershaft 112 via drive gear m3→m5→driven gear n5.

When the rotation angle of the shift spindle is changed from fifth to sixth, the first clutch 108A is disconnected to make transition to rotational driving of the outer shaft 110o by the second clutch 108B. Furthermore, the drive gear m6 returns to the neutral position and the driven gear n4 moves toward the axial-direction right side. Thus, the rotational force of the outer shaft 110o is transmitted to the countershaft 112 via drive gear m6→driven gear n6→n4.

When the rotation angle of the shift spindle is changed from sixth to seventh, the second clutch 108B is disconnected to make transition to rotational driving of the inner shaft 110i by the first clutch 108A, and the drive gear m3 moves toward the axial-direction right side. Thus, the rotational force of the inner shaft 110i is transmitted to the countershaft 112 via drive gear m3→drive gear m7→driven gear n7.

Shift-down actions are reverse actions of the above-described shift-up actions and thus description thereof is omitted. All shift-down actions are also made to cause the countershaft 112 to make positive rotation.

In the present embodiment, the transmission 40 has a backing gear train 180 for carrying out backing. The backing gear train 180 has a drive gear mB set between the drive gear m1 of the inner shaft 110i and the drive gear m6 of the outer shaft 110o, and a driven gear nB set between the driven gears n1 and n6 of the countershaft 112. The drive gear mB is a free gear and the driven gear nB is a free gear that is made monolithically with the driven gear n1 and rotates integrally with the driven gear n1. Furthermore, the drive gear mB and the driven gear nB rotate in the same direction by a chain 182.

Moreover, when the rotation angle of the shift spindle is changed to an angle that is set in advance and corresponds to the reverse mode, the position of the shift drum is set to the position for the reverse mode set in advance. Furthermore, the drive gear m6 slides from the neutral position toward the axial-direction right side and the driven gear n4 slides from the neutral position toward the axial-direction left side. Consequently, one dog d6a of the drive gear m6 is engaged with a dog hole db of the drive gear mB and the other dog e4b of the driven gear n4 is engaged with the dog hole e2 of the driven gear n2.

After transition to the reverse mode, advancing action in the reverse mode is made by operating the advancing switch 74. Specifically, the second clutch 108B is connected and the first clutch 108A is disconnected. Consequently, the rotational force of the crankshaft in the idle state is transmitted to the outer shaft 110o via the second clutch 108B. Due to this, the rotational force of the outer shaft 110o is transmitted to the countershaft 112 via drive gear m2→driven gear n2→driven gear n4 and the countershaft 112 makes positive rotation. The rotational force of this positive rotation is transmitted to the driveshaft, so that the motorcycle 10 advances. Although the rotational force of the outer shaft 110o is transmitted to the inner shaft 110i via drive gear m6→drive gear mB→chain 182→driven gear nB→driven gear n1→drive gear m1, the inner shaft 110i only rotates idly because the odd-numbered stages are in the neutral state.

After transition to the reverse mode, backing action in the reverse mode is made by operating the backing switch 72. Specifically, the first clutch 108A is connected and the second clutch 108B is disconnected. Thus, the rotational force of the crankshaft in the idle state is transmitted to the inner shaft 110i via the first clutch 108A. Due to this, the rotational force of the inner shaft 110i is transmitted to the outer shaft 110o via drive gear m1→driven gear n1→driven gear nB→chain 182→drive gear mB→drive gear m6. In this case, the outer shaft 110o makes rotation in the opposite direction of the rotation direction of the inner shaft 110i. Furthermore, the rotational force of this outer shaft 110o is transmitted to the countershaft 112 via drive gear m2→driven gear n2→driven gear n4. In this case, the countershaft 112 makes rotation in the reverse direction of the rotation direction of the outer shaft 110o (rotation in the same direction as the inner shaft 110i), i.e. reverse rotation. The rotational force of this reverse rotation is transmitted to the driveshaft, so that the motorcycle 10 backs.

Next, processing actions of the control system 106 in the reverse mode will be described with reference to flowcharts of FIGS. 7 and 8.

Figure 7:
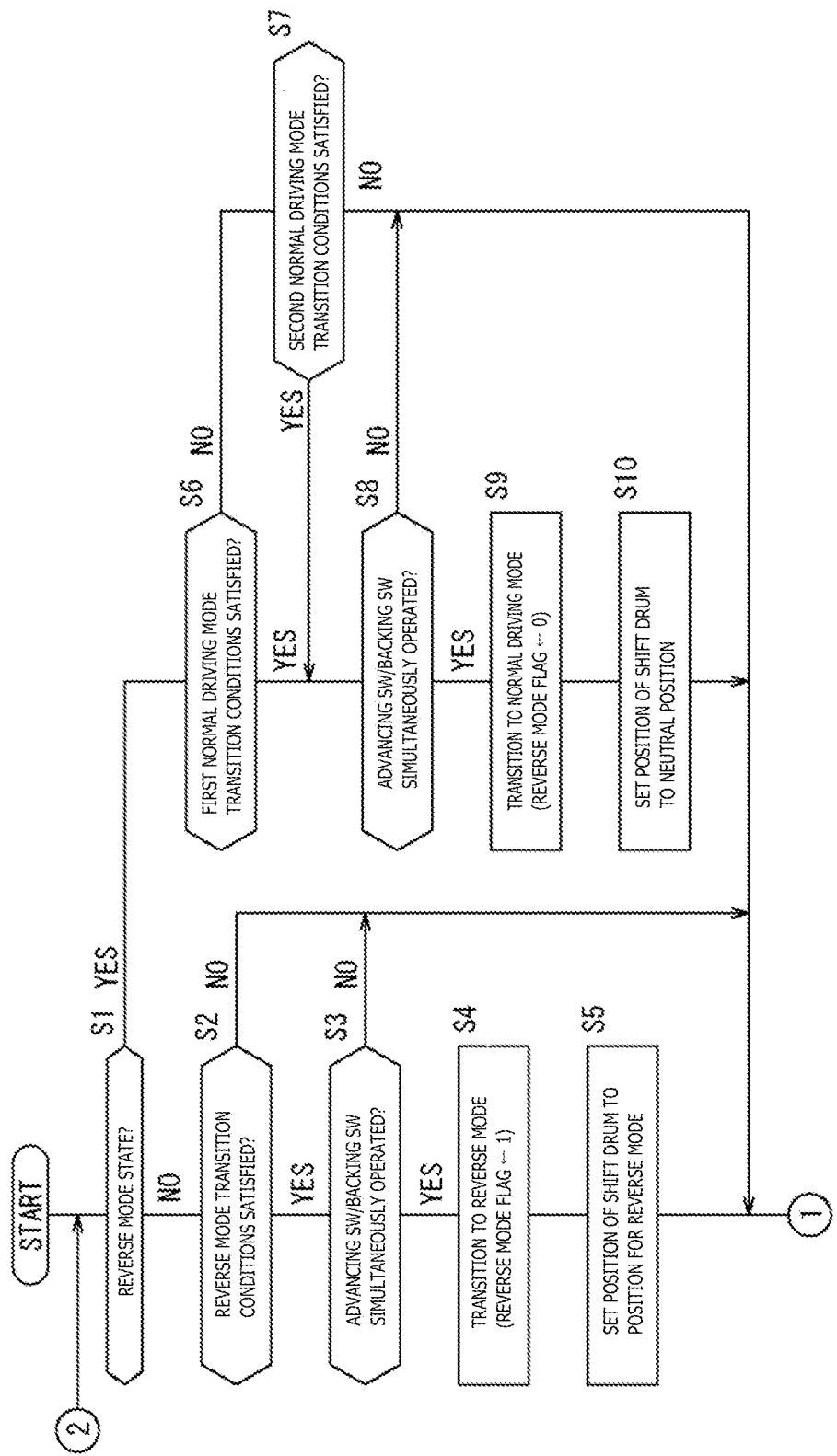
FIG. 7 is a flowchart (first flowchart) showing processing actions of a control system in a reverse mode.

First, in a step S1 in FIG. 7, the reverse mode transition determining section 156 determines whether or not the motorcycle 10 is currently in the reverse mode state. This determination is made based on whether the reverse mode flag 166 is "1."

If the motorcycle 10 is not in the reverse mode state, the processing proceeds to the next step S2, where the reverse mode transition determining section 156 determines whether or not the state of the motorcycle 10 satisfies reverse mode transition conditions set in advance. Satisfying the reverse mode transition conditions means satisfying all of the following conditions:

(a-1) the shift motor 114 is in the stopped state
(a-2) the position of the shift drum is neutral
(a-3) the accelerator position (throttle position) is the fully-closed position
(a-4) vehicle-stopped state
(a-5) the engine rotation speed is in the idle state
(a-6) the brake switch 140 is in the on-state
(a-7) the side stand 64 is in the raised state If the above-described reverse mode transition conditions are satisfied, the processing proceeds to the next step S3, where the reverse mode transition determining section 156 determines whether simultaneous operation of the advancing switch 74 and the backing switch 72 is being carried out.

If simultaneous operation of the advancing switch 74 and the backing switch 72 is being carried out, the processing proceeds to the next step S4, where the motorcycle 10 enters the reverse mode. That is, the reverse mode transition determining section 156 sets "1" in the reverse mode flag 166.

Then, in a step S5, the drum action control section 164 drives and controls the shift motor 114 to set the position of the shift drum to the position for the reverse mode. Consequently, one dog d6a of the drive gear m6 is engaged with the dog hole db of the drive gear mB and the other dog e4b of the driven gear n4 is engaged with the dog hole e2 of the driven gear n2.

On the other hand, if it is determined in the step S1 that the motorcycle 10 is in the reverse mode state, the processing proceeds to a step S6, where the normal driving mode transition determining section 158 determines whether or not the state of the motorcycle 10 satisfies all of first normal driving mode transition conditions (b-1) to (b-5) set in advance:

(b-1) the shift motor 114 is in the stopped state
(b-2) the position of the shift drum is the advancing position (first) or the backing position
(b-3) the accelerator position (throttle position) is the fully-closed position
(b-4) vehicle-stopped state
(b-5) the brake switch 140 is in the on-state If all of the above-described first normal driving mode transition conditions (b-1) to (b-5) are not satisfied, the processing proceeds to the next step S7, where the normal driving mode transition determining section 158 determines whether or not all of second normal driving mode transition conditions (b-6) to (b-8) are satisfied:

(b-6) engine-stopped state
(b-7) stopping vehicle speed (5 km/h or lower)
(b-8) the side stand 64 is in the raised state If it is determined in the step S6 that all of the first normal driving mode transition conditions (b-1) to (b-5) are satisfied or if it is determined in the step S7 that all of the second normal driving mode transition conditions (b-6) to (b-8) are satisfied, the processing proceeds to the next step S8, where the normal driving mode transition determining section 158 determines whether simultaneous operation of the advancing switch 74 and the backing switch 72 is being carried out.

If simultaneous operation of the advancing switch 74 and the backing switch 72 is being carried out, the processing proceeds to the next step S9, where the motorcycle 10 enters the normal driving mode. That is, the normal driving mode transition determining section 158 resets "1" of the reverse mode flag 166 to "0."

Then, in a step S10, the drum action control section 164 drives and controls the shift motor 114 to set the position of the shift drum to the neutral position.

Figure 8:
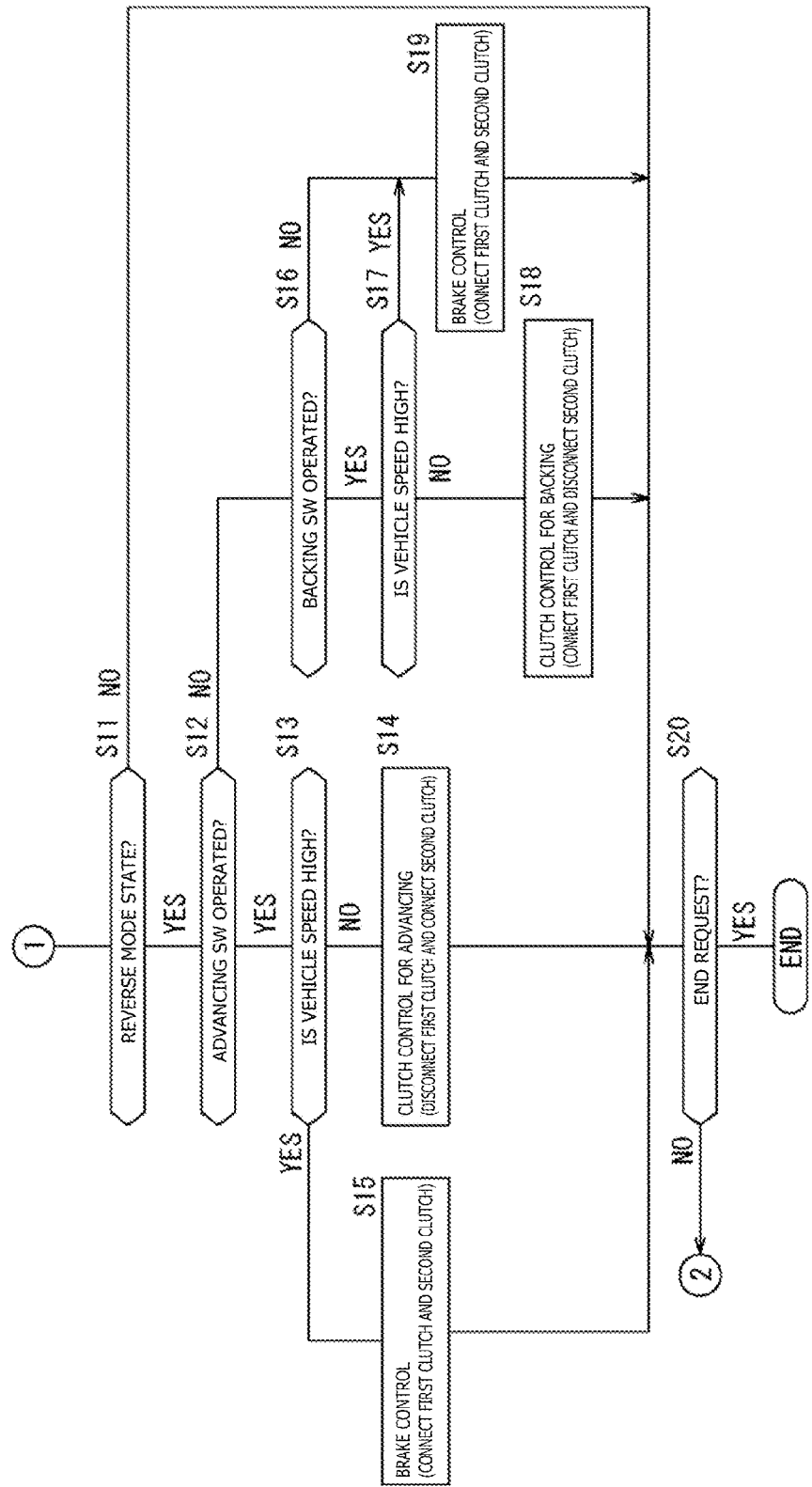
FIG. 8 is a flowchart (second flowchart) showing processing actions of the control system in the reverse mode.

If the processing in the above-described step S5 or step S10 ends, or if it is determined in the above-described step S2 that the reverse mode transition conditions (a-1) to (a-7) are not satisfied, or if it is determined in the step S7 that the second normal driving mode transition conditions (b-6) to (b-8) are not satisfied, or if it is determined in the step S3 or the step S8 that simultaneous operation of the advancing switch 74 and the backing switch 72 is not being carried out, the processing proceeds to a step S11 in FIG. 8.

In the step S11, the reverse mode transition determining section 156 determines whether or not the motorcycle 10 is in the reverse mode state similarly to the above-described step S1.

If the motorcycle 10 is in the reverse mode state, the processing proceeds to the next step S12, where the advancing/backing clutch oil pressure control section 162 determines whether or not the advancing switch 74 is being operated.

If the advancing switch 74 is being operated, in the next step S13, the advancing/backing clutch oil pressure control section 162 determines whether or not the vehicle speed is higher than a threshold set in advance. If the vehicle speed is not higher, the processing proceeds to the next step S14, where the advancing/backing clutch oil pressure control section 162 controls the first electromagnetic valve 150A and the second electromagnetic valve 150B to connect the second clutch 108B and disconnect the first clutch 108A. This causes the motorcycle 10 to advance at a low speed.

On the other hand, if it is determined in the step S13 that the vehicle speed is higher than the threshold, the processing proceeds to a step S15, where the advancing/backing clutch oil pressure control section 162 controls the first electromagnetic valve 150A and the second electromagnetic valve 150B to connect the first clutch 108A in addition to the second clutch 108B. Due to the connection of the first clutch 108A, the rotational force of the crankshaft (force in the rotation direction opposite to the rotation direction of the inner shaft 110i) is applied to the inner shaft 110i, which lowers the rotational force of the countershaft 112. Moreover, the advancing/backing clutch oil pressure control section 162 carries out brake control by controlling the oil pressure to the first clutch 108A and the oil pressure to the second clutch 108B so that the vehicle speed may become a stopping vehicle speed.

If it is determined in the above-described step S12 that the advancing switch 74 is not being operated, in the next step S16, the advancing/backing clutch oil pressure control section 162 determines whether or not the backing switch 72 is being operated.

If the backing switch 72 is being operated, in the next step S17, the advancing/backing clutch oil pressure control section 162 determines whether or not the vehicle speed is higher than a threshold set in advance. If the vehicle speed is not higher, the processing proceeds to the next step S18, where the advancing/backing clutch oil pressure control section 162 controls the first electromagnetic valve 150A and the second electromagnetic valve 150B to connect the first clutch 108A and disconnect the second clutch 108B. This causes the motorcycle 10 to back at a low speed.

On the other hand, if it is determined in the step S17 that the vehicle speed is higher than the threshold or if the backing switch 72 is not being operated in the step S16 (i.e. if neither the advancing switch 74 nor the backing switch 72 is being operated), the processing proceeds to a step S19, where the advancing/backing clutch oil pressure control section 162 controls the first electromagnetic valve 150A and the second electromagnetic valve 150B to connect the second clutch 108B in addition to the first clutch 108A. Due to the connection of the second clutch 108B, the rotational force of the crankshaft (force in the rotation direction opposite to the rotation direction of the outer shaft 110o) is applied to the outer shaft 110o, which lowers the rotational force of the countershaft 112. Moreover, the advancing/backing clutch oil pressure control section 162 carries out brake control by controlling the oil pressure to the first clutch 108A and the oil pressure to the second clutch 108B so that the vehicle speed may become a stopping vehicle speed.

If the processing in the above-described step S14, step S15, step S18, or step S19 ends or if it is determined in the step S11 that the motorcycle 10 is not in the reverse mode state, the processing proceeds to the next step S20, where it is determined whether or not an end request to the processing action of the control system 106 (request for powering off or maintenance or the like) has been made. If the end request has not been made, the processing of the step S1 in FIG. 7 and the subsequent steps is repeated. At the timing when the end request is made, this processing action of the control system 106 ends.

As above, in the present embodiment, when the reverse mode is set, shift operation of the transmission 40 by the shift-down switch 74 and the shift-up switch 72 is disabled and the motorcycle 10 is allowed to advance through operation of the shift-down switch 74 and to back through operation of the shift-up switch 72.

This can achieve common use of the handle switch with a motorcycle that does not have the reverse mode function. In addition, because a dedicated switch does not need to be provided, increase in the number of switches can be suppressed and the lowering of the layout efficiency of the switches can also be suppressed. It is also possible to make the handle switch compact, of course.

Furthermore, it is possible to use in common a combination of switches to implement a pair of functions in the normal driving mode, i.e. the shift-down switch 74 and the shift-up switch 72, and a combination of switches to implement a pair of functions in the reverse mode, i.e. the advancing switch 74 and the backing switch 72. This can make the handle switch compact.

In addition, it is easy for the user to recognize operation and confusion about the operating method due to the common use of the switches can be avoided.

Furthermore, in the present embodiment, the shift-down switch 74 and the shift-up switch 72 serve also as the reverse mode setting input part 80 and the reverse mode is set by simultaneous operation of the shift-down switch 74 and the shift-up switch 72. Operating two switches that are not simultaneously operated normally allows the intention of switching to the reverse mode to be definitely confirmed, which can prevent erroneous operation. In addition, because the shift-down switch 74 and the shift-up switch 72 serve also as the reverse mode setting input part 80, there is no need to additionally provide the reverse mode setting input part 80 in the handle switch and thus the handle switch can be made more compact.

Moreover, in the present embodiment, throttle operation by the driver is disabled and the engine rotation speed is controlled and kept constant during a period in which the reverse mode is set. For example, the driver is given a feeling of anxiety if the engine rotation speed varies in driving with the motorcycle 10 at an extremely low speed, such as when the driver is walking while holding the motorcycle 10 being caused to advance or back. However, during the period in which the reverse mode is set, the engine rotation speed is kept constant and therefore hunting of the engine rotation speed (it refers to repetition of a phenomenon in which the engine rotation speed increases or decreases) can be prevented. This can eliminate a feeling of anxiety to the driver due to variation in the engine rotation speed in the period during which the reverse mode is set.

Furthermore, in the present embodiment, the clutch system 108 of the transmission 40 has the first clutch 108A and the second clutch 108B. A driving force in the advancing direction is generated by connecting the second clutch 108B and a driving force in the backing direction is generated by connecting the first clutch 108A.

In the reverse mode, the motorcycle 10 can be made to advance or back by connecting either one clutch. Furthermore, connecting the first clutch 108A and the second clutch 108B enables very-low-speed control by so-called half-clutch control. In addition, advancing, backing, and very-low-speed control in the reverse mode can be controlled by using the shift-down switch 74 and the shift-up switch 72, by which the clutch is switched in normal gear shifting. This allows the operation in the reverse mode to match the operational feeling of the driver in the normal driving mode.

For example, by operating the shift-down switch 74 (advancing switch) in a state in which the driver is operating the shift-up switch 72 (backing switch) to make the motorcycle 10 back, the driver can intuitively recognize a feeling that a force of advancing is added and brake control is carried out.

Furthermore, in the present embodiment, the shift-down switch 74 to make the motorcycle 10 advance is set at such a position as to function by being operated in the advancing direction and the shift-up switch 72 to make the motorcycle 10 back is set at such a position as to function by being operated in the backing direction. This allows the operation direction to match the traveling direction of the motorcycle 10, which can improve the operability for the driver.

Figure 9:
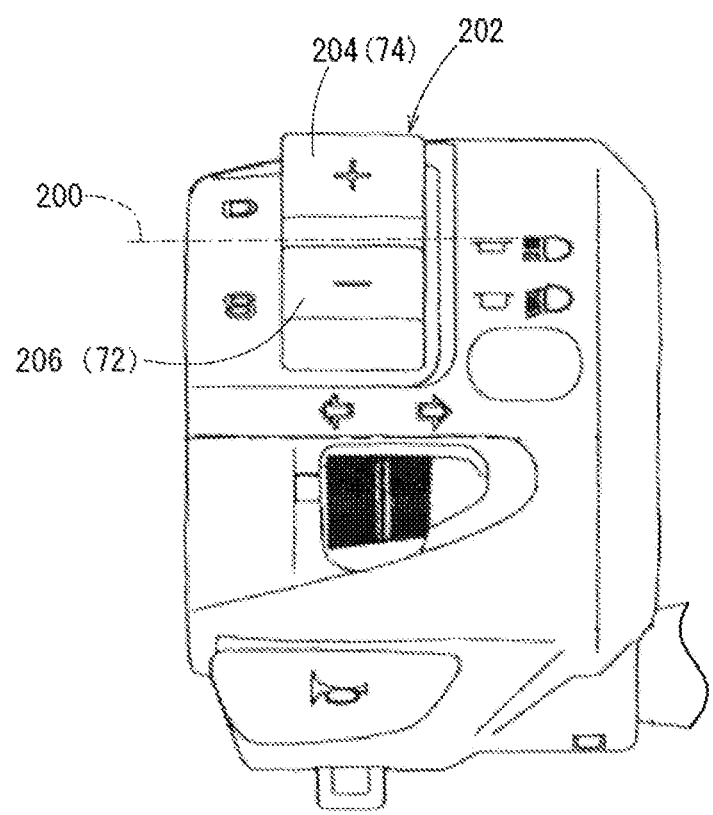
FIG. 9 is a front view showing one example of a seesaw switch.

As the above-described switch, the example in which the advancing switch 74 and the backing switch 72 are separately set is shown. However, besides, as shown in FIG. 9, these switches may be formed by one seesaw switch 202 whose rotation axis 200 is set along a direction orthogonal to the front-rear direction of the motorcycle 10. In this case, it is preferable to set a front operation part 204 of the seesaw switch 202 as the advancing switch 74 and set a rear operation part 206 as the backing switch 72. This allows the operation direction of the seesaw switch 202 to match the traveling direction of the motorcycle 10. Due to this, the driver is allowed to intuitively image advancing and backing, which can prevent erroneous operation and improve the operability.

In this case, by causing the advancing switch 74 to function as a shift-up switch and causing the backing switch 72 to function as a shift-down switch in the normal driving mode, the operation direction of the seesaw switch 202 is allowed to match the shift direction of the shifting stage, which can improve the operability for the driver.

It is obvious that the saddle-type vehicle according to the present invention is not limited to the above-described embodiment and can employ various configurations without departing from the gist of the present invention.

DESCRIPTION OF REFERENCE SYMBOLS

10 . . . Motorcycle
24 . . . Handlebar
30 . . . Right switch case
32 . . . Left switch case
38 . . . Front wheel
40 . . . Transmission
44 . . . Rear wheel
64 . . . Side stand
72 . . . Shift-up switch (backing switch)
74 . . . Shift-down switch (advancing switch)
75 . . . Handle switch
80 . . . Reverse mode setting input part
100 . . . Engine
102 . . . Throttle control system
106 . . . Control system (ECU)
108 . . . Clutch system
108A . . . First clutch
108B . . . Second clutch
110 . . . Main shaft
110i . . . Inner shaft
110o . . . Outer shaft
112 . . . Countershaft
114 . . . Shift motor
150A . . . First electromagnetic valve
150B . . . Second electromagnetic valve
156 . . . Reverse mode transition determining section
158 . . . Normal driving mode transition determining section
160 . . . Engine rotation keeping-constant control section
162 . . . Advancing/backing clutch oil pressure control section
164 . . . Drum action control section
176 . . . Clutch control system
180 . . . Backing gear train
182 . . . Chain
200 . . . Rotation axis
202 . . . Seesaw switch

What is claimed is:

1. A saddle-type vehicle that is a saddle-type vehicle having a handle switch obtained by providing a switch case with a first shift switch to carry out operation of one of shift-up and shift-down of a transmission and a second shift switch to carry out operation of the other of shift-up and shift-down of the transmission, the switch case being fixed to a handlebar and being provided with a plurality of switches to operate various kinds of electrical components, the saddle-type vehicle comprising:
a backing-enabled mode setting input part that sets a backing-enabled mode in which backing driving of the saddle-type vehicle is permitted; and
a control system that disables shift operation of the transmission by the first shift switch and the second shift switch and causes the saddle-type vehicle to advance through operation of the first shift switch and to back through operation of the second shift switch when the backing-enabled mode is set.

2. The saddle-type vehicle according to claim 1, wherein the first shift switch and the second shift switch serve also as the backing-enabled mode setting input part, and
the backing-enabled mode is set by simultaneous operation of the first shift switch and the second shift switch.

3. The saddle-type vehicle according to claim 1, wherein throttle operation by a driver is disabled and an engine rotation speed is controlled and kept constant during a period in which the backing-enabled mode is set.

4. The saddle-type vehicle according to claim 1, wherein a drive system of the transmission has two clutches,
a driving force in an advancing direction is generated by connecting one clutch of the two clutches, and
a driving force in a backing direction is generated by connecting the other clutch of the two clutches.

5. The saddle-type vehicle according to claim 1, wherein the first shift switch is disposed at such a position as to function by being operated in an advancing direction, and
the second shift switch is disposed on an opposite side to the first shift switch across an axial line of the handlebar and at such a position as to function by being operated in a backing direction.

6. The saddle-type vehicle according to claim 1, comprising
one seesaw switch including the first shift switch and the second shift switch,
wherein
the seesaw switch is so disposed that the first shift switch is located on a front side and the second shift switch is located on a rear side.

7. The saddle-type vehicle according to claim 6, wherein the control system causes the first shift switch to function as a shift-up switch and causes the second shift switch to function as a shift-down switch when setting of the backing-enabled mode is deactivated.

8. The saddle-type vehicle according to claim 2, wherein throttle operation by a driver is disabled and an engine rotation speed is controlled and kept constant during a period in which the backing-enabled mode is set.

9. The saddle-type vehicle according to claim 2, wherein a drive system of the transmission has two clutches,
a driving force in an advancing direction is generated by connecting one clutch of the two clutches, and
a driving force in a backing direction is generated by connecting the other clutch of the two clutches.

10. The saddle-type vehicle according to claim 3, wherein a drive system of the transmission has two clutches,
a driving force in an advancing direction is generated by connecting one clutch of the two clutches, and
a driving force in a backing direction is generated by connecting the other clutch of the two clutches.

11. The saddle-type vehicle according to claim 2, wherein the first shift switch is disposed at such a position as to function by being operated in an advancing direction, and
the second shift switch is disposed on an opposite side to the first shift switch across an axial line of the handlebar and at such a position as to function by being operated in a backing direction.

12. The saddle-type vehicle according to claim 3, wherein the first shift switch is disposed at such a position as to function by being operated in an advancing direction, and
the second shift switch is disposed on an opposite side to the first shift switch across an axial line of the handlebar and at such a position as to function by being operated in a backing direction.

13. The saddle-type vehicle according to claim 4, wherein the first shift switch is disposed at such a position as to function by being operated in an advancing direction, and
the second shift switch is disposed on an opposite side to the first shift switch across an axial line of the handlebar and at such a position as to function by being operated in a backing direction.

14. The saddle-type vehicle according to claim 2, comprising
one seesaw switch including the first shift switch and the second shift switch,
wherein
the seesaw switch is so disposed that the first shift switch is located on a front side and the second shift switch is located on a rear side.

15. The saddle-type vehicle according to claim 14, wherein
the control system causes the first shift switch to function as a shift-up switch and causes the second shift switch to function as a shift-down switch when setting of the backing-enabled mode is deactivated.

16. The saddle-type vehicle according to claim 3, comprising
one seesaw switch including the first shift switch and the second shift switch,
wherein
the seesaw switch is so disposed that the first shift switch is located on a front side and the second shift switch is located on a rear side.

17. The saddle-type vehicle according to claim 16, wherein
the control system causes the first shift switch to function as a shift-up switch and causes the second shift switch to function as a shift-down switch when setting of the backing-enabled mode is deactivated.

18. The saddle-type vehicle according to claim 4, comprising
one seesaw switch including the first shift switch and the second shift switch,
wherein
the seesaw switch is so disposed that the first shift switch is located on a front side and the second shift switch is located on a rear side.

19. The saddle-type vehicle according to claim 18, wherein
the control system causes the first shift switch to function as a shift-up switch and causes the second shift switch to function as a shift-down switch when setting of the backing-enabled mode is deactivated.

* * * * *